United States Patent
Pytel et al.

[11] 3,923,488
[45] Dec. 2, 1975

[54] METHOD OF TEMPERING FLAT GLASS SHEETS

[75] Inventors: Richard N. Pytel, Ford City; Fred H. Burdett, Worthington; Steve M. Kozuch, Ford City, all of Pa.

[73] Assignee: PPG Industries, Inc., Pittsburgh, Pa.

[22] Filed: Apr. 26, 1974

[21] Appl. No.: 464,405

[52] U.S. Cl. .................. 65/114; 65/104; 65/119
[51] Int. Cl.² ............................... C03B 27/00
[58] Field of Search ............ 65/104, 114, 118, 119, 65/115

[56] References Cited
UNITED STATES PATENTS
3,522,029   7/1970   Carson et al. ................... 65/104
3,567,415   3/1971   Carpenter ........................ 65/115 X

*Primary Examiner*—Arthur D. Kellogg
*Attorney, Agent, or Firm*—Edward I. Mates; Thomas F. Shanahan

[57] ABSTRACT

In tempering flat glass sheets while conveyed on a roller conveyor, which moves the glass continuously through an enclosed furnace and along a horizontal path between opposing sets of nozzles or modules through which spaced blasts of cooling medium are applied to the opposite glass sheet surfaces, the leading edge of the glass sheet tends to curl upward. In large sheets, such as those having a dimension of at least one meter, the leading edge deviates from flatness a distance sufficient to cause the glass sheets to fail to meet customer specifications. The present invention reduces this deviation from flatness by applying a cooling medium toward a portion of the lower surface of the glass sheet in spaced relation to its leading edge. This application is started after the glass sheet leaves the furnace and before the glass portion so heated reaches a position where both its upper and lower surfaces are cooled by exposure to opposing blasts of cooling medium.

6 Claims, 8 Drawing Figures

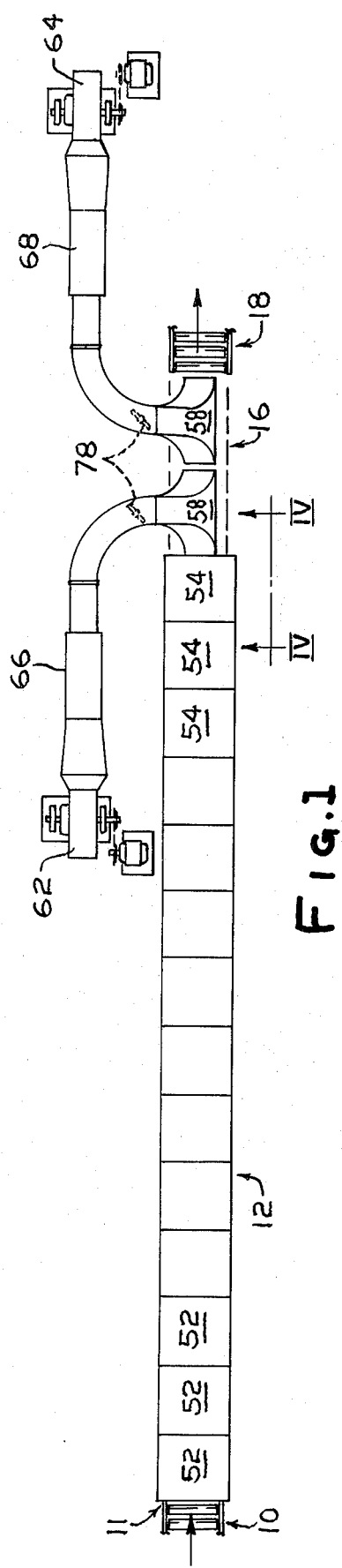
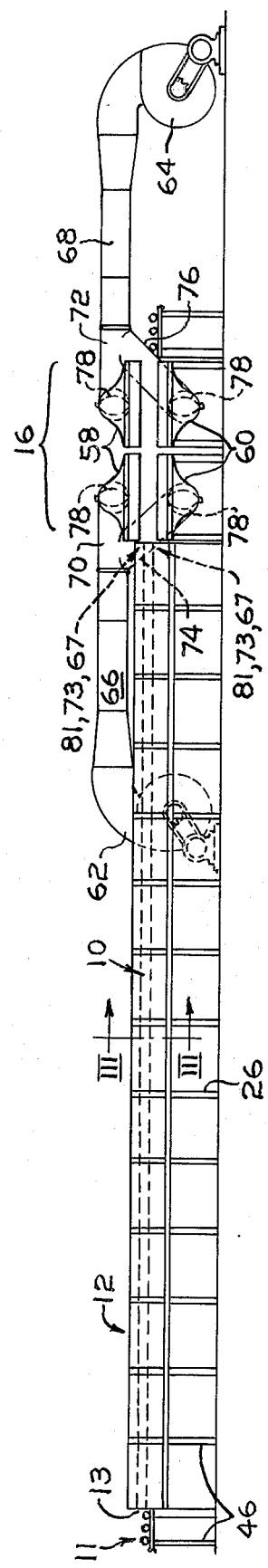

METHOD OF TEMPERING FLAT GLASS SHEETS

BACKGROUND OF THE INVENTION

1. Field of the Invention

The present invention relates to the tempering of flat glass sheets and particularly glass sheets having at least one dimension (length or width) exceeding one meter while a series of glass sheets are conveyed on a so-called roller hearth conveyor that supports a series of moving glass sheets along a substantially horizontal path through a tunnel-type furnace and then between upper and lower means to apply cooling medium against the upper and lower glass sheet surfaces. Typical roller hearth conveyors are disclosed in U.S. Pat. No. 3,245,772 to Cypher and Davidson and U.S. Pat. No. 3,672,861 to Ritter and Hymore.

In well-known commercial procedures for tempering glass sheets or plates, sheets are first heated to a temperature corresponding substantially to the softening point of the glass and then tempered by chilling the sheet to a temperature below the annealing range of the glass. Conventionally, the heated sheet is received from the furnace upon a series of horizontally disposed conveyor rolls which carry the sheet forwardly between upper and lower plenums which flush the opposite surfaces of the sheet with streams of a suitable cooling fluid, such as air under predetermined pressure applied through arrays of nozzles, to chill the glass and impart the desired stresses therein. When tempering flat sheets of glass, the cooling air is directed against opposite surfaces of the sheet while the sheet moves between the upper and lower plenums.

The technique described above is usually suitable for tempering glass sheets up to a certain maximum size despite the presence of an upward curl at the leading edge of the sheets. However, with larger glass sheets having one or more dimensions greater than one meter, the leading edge of the glass sheet develops an enlarged upward curl. In such larger glass sheets, the leading edge curl is usually sufficiently severe to cause the glass sheet to depart from the flat shape desired an amount sufficient for the glass to be outside tolerance requirements and leads to customer rejects.

2. Description of the Prior Art

U.S. Pat. No. 3,245,772 Cypher and Davidson and U.S. Pat. No. 3,672,861 to Ritter and Hymore disclose typcal flat glass tempering apparatus utilizing a roller hearth. Each glass sheet that leaves the furnace is cooled along its entire length by air deposited through upper and lower relatively narrow slots or arrays of circular nozzles along paths having a component directed toward the path of travel of the glass sheet. Cool air is applied against the upper and lower surfaces of the hot glass sheet at a rate sufficient to impart a temper to the glass.

While relatively short sheets produced by said patented apparatus do not necessarily fail to meet customer specifications despite the upward curl present at the leading edge of the glass sheet, the upward curl becomes increasingly severe when longer sheets are tempered while conveyed on the roller hearth. The need for tempered glass sheets having a larger area than those for which the roller hearth apparatus was originally designed made it desirable to develop a technique to use existing roller hearth apparatus to produce a wider range of sizes of tempered glass sheets.

SUMMARY OF THE INVENTION

The present invention makes it possible to use roller hearth apparatus for tempering flat, elongated glass sheets having a dimension greater than one meter and still meet customer specifications for flat tempered glass. According to a typical embodiment, an upward directed flow of cooling medium is directed against a portion only of the bottom surface only of the glass sheet after the leading edge portion of the glass sheet has passed beyond the position where the upwardly directed blasts of cooling medium intersect the path of glass sheet movement from the furnace to the cooling station. Preferably, a leading edge portion of 12 to 24 inches in length passes across a line through which cooling medium is applied in an upward direction before starting said application.

According to an illustrative embodiment of the present invention, the cooling medium used is air for economy purposes, a row of modules is provided across the width of the roller hearth conveyor between the furnace exit and the entrance to the cooling station, and air is applied upwardly at a controlled flow rate through each module of the row of modules to provide a desired pattern of upward flow. In a particular embodiment, the upward flow of air is applied to the outer side portions of the glass only as will be described in greater detail hereinafter.

BRIEF DESCRIPTION OF THE DRAWINGS

In the drawings forming part of the description of the illustrative embodiment wherein like reference numerals refer to like structural elements, FIG. 1 is a plan view of a conveyor for tempering glass sheets employing the principles of the present invention;

FIG. 2 is a longitudinal elevation of the apparatus depicted in FIG. 1.

DESCRIPTION OF AN ILLUSTRATIVE EMBODIMENT

Figure 3:
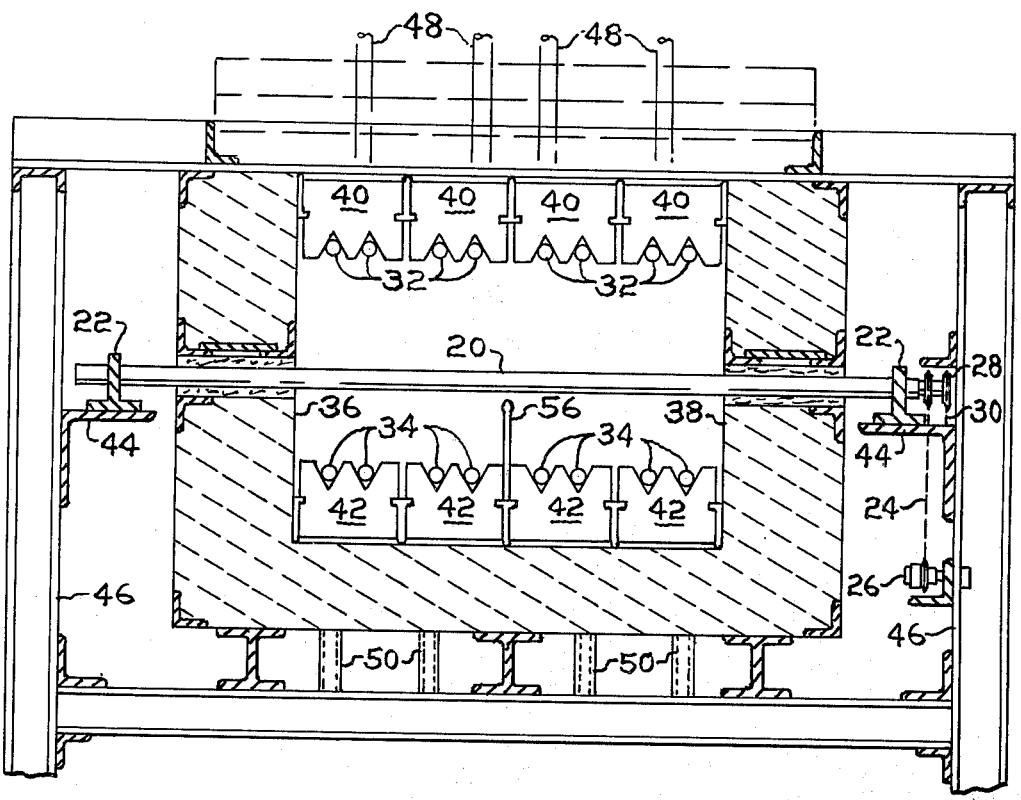
FIG. 3 is a cross-sectional view of the furnace showing the arrangement of heating elements and the conveyor rolls taken along the lines III—III of FIG. 2.
Figure 4:
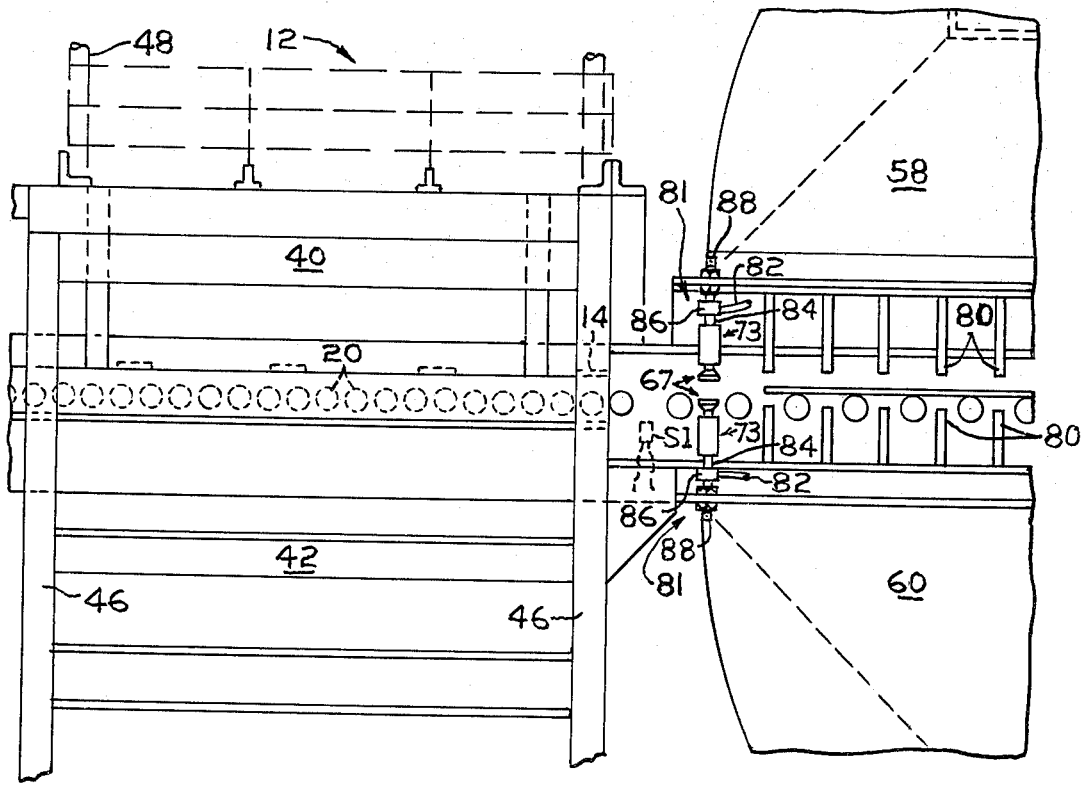
FIG. 4 is a fragmentary longitudinal elevational view of a portion of the furnace and a portion of the tempering apparatus taken along the lines IV—IV of FIG. 1 and showing certain details thereof.

The apparatus comprises a horizontal conveyor 10 that provides a substantially horizontal path extending from a loading station 11 through a tunnel-like furnace 12 having a horizontal slot entrance 13 and a horizontal slot exit 14, a cooling station 16, and a glass unloading station 18. The conveyor comprises a series of solid rolls 20 made of 316 stainless steel.

Each roll extends horizontally through a pair of transversely spaced bearing housings 22 and is driven by means of one or more chain drives 24 driven by a motor 26. Sprockets 28 at one end of the drive shafts for each conveyor roll 20 are interconnected through a connecting chain 30.

The tunnel-like lehr 12 is provided with upper heating elements 32 and lower heating elements 34 extending longitudinally of the furnace. The conveyor rolls 20 extend through apertures in the respective side walls 36 and 38 of furnace 12 aligned with bearing housings 22 to form a series of conveyor elements extending transversely of the path of movement and spaced longitudinally thereof along the length of the furnace.

Each of the heating elements 32 and 34 comprises an electrical resistance, preferably of nichrome wire mounted in a refractory element 40 or 42. The refractory elements 40 supported by the furnace roof support the upper heating elements 32 and the refractory elements 42 supported by the furnace floor support the lower heating elements 34.

Each of the refractory support elements 40 and 42 extend longitudinally of the furnace 12 and each is provided with a series of grooves extending longitudinally of the furnace. Each electrical resistance wire is connected to an individual control circuit.

Each of the refractory elements 40 is located in side-by-side relationship above the portion of conveyor 10 within the furnace 12. Refractory elements 42 are disposed below the conveyor rolls 20 in mirror relation opposing refractory elements 40. The upper heating elements 32 face the upper surface of the glass sheets moving through the furnace while the lower heating elements 34 face the bottom surface of said glass sheets.

Each bearing housing 22 is supported on a horizontally extending angle iron 44 extending longitudinally and immediately outside the sidewalls of the furnace 12. Each angle iron 44, in turn, is rigidly attached to one of a series of vertical pillars 46 which forms part of a metal structure reinforcing and surrounding the tunnel-like furnace 12.

Each of the upper heating elements 32 is connected to a voltage regulator circuit (not shown) by means of lead wires extending through conduits 48. Similarly the lower heating elements 34 are connected to additional voltage regulator circuits (also not shown) through lead wires extending through conduits 50. The relative amount of voltage applied to opposing sets of heating elements 32 and 34 may be controlled independently as desired.

Many well-known voltage control circuits available commercially are suitable for this purpose. The control circuit for controlling the voltage supplied to each heating element 32 and 34 may be of the type described in U.S. Pat. No. 2,774,190 to Florian V. Atkeson, the description of which is incorporated by reference in the present application.

The furnace 12 is divided into several preheat sections 52 followed by a few intense heating sections 54. Each of the furnace sections 52 and 54 may include a heat-sensing device 56 located centrally of the furnace section to provide a continuous reading of the ambient air between the rolls in the center of each furnace section.

After the glass has been heated to the desired temperature while transported through the furnace 12, it is conveyed before it cools substantially from the furnace 12 into the cooling station 16. A glass sensing element S-1 is located near the exit of the furnace to actuate apparatus to control the application of cooling medium to a selected portion of the glass sheet en route to the cooling station 16.

The cooling station 16 of the illustrative embodiment comprises upper plenum chambers 58 and lower plenum chambers 60. Air under pressure is furnished to the plenum chambers 58 and 60 through blowers 62 and 64 and conduits 66 and 68. Branch conduits 70 and 72 supply air to the upper plenum chambers 58 from conduits 66 and 68. Branch conduits 74 and 76 supply air to the lower plenum chambers 60 from conduits 66 and 68. A value 78 is located in each of the branch conduits 70, 72, 74, and 76 in order to control the rate of flow of air from the blowers 62 and 64 into the upper and lower plenum chambers 58 and 60. The upper and lower plenum chambers have a series of parallel slot nozzles 80, each extending transversely of the longitudinal axis of the conveyor 10 and each spaced from one another to provide escape paths between the streams of air applied against the glass.

Additional conveyor rolls are provided beyond the cooling station 16. Glass sheets conveyed past the cooling station 16 are thus accessible in this extension of the conveyor for unloading. Hence, this conveyor section is termed the unloading section 18.

A particular apparatus illustrating the present invention will now be described as well as its method of operation in order to provide a complete disclosure in accordance with the requirements of the Patent Office.

The apparatus just described constitutes a typical roller hearth type of glass sheet tempering apparatus. In order to perform the present invention, the roller hearth just described is modified as follows.

Immediately beyond the furnace exit and intermediate adjacent longitudinally spaced conveyor rolls 20 at the entrance of cooling station 16, there is provided a row of upper and lower vortex tubes 81 (although more than one row may be included, if desired). Each vortex tube communicates with a distribution chamber 73, each containing a set of modules 67. Conventional elongated slot type nozzles 80 are arranged intermediate additional conveyor rolls 20 located subsequently along the path of travel throughout the remainder of the cooling station 16. The conventional nozzles 80 discharge streams of compressed air against the opposite surfaces of glass sheets after the latter are initially cooled by the cold gas component from vortex tubes 81 that is fed toward the glass sheet surfaces through the modules 67 as will be explained in detail later.

The vortex tube illustrated is a counterflow vortex tube for the emission of cold and hot gas streams corresponding to given available gas pressures and flows and desired cold fractions. A suitable vortex tube is available commercially from the Vortec Corporation as Model No. 208 vortex tube provided with a No. 24 generator.

Cold air under pressure is introduced into each vortex tube 81 through an inlet tube 82 into a generator 86. The vortex generator 86 supplies a cold air component into a cold air outlet tube 84 and a hot air component into a hot air outlet tube 88.

The vortex tube 81, when supplied with dehumidified compressed air at 70° F. and 100 p.s.i.g. and discharging at atmospheric pressure, will produce a small fraction of cold air at minus 50° F. or below when the hot air tube 88 is ¼ inch in diameter and the capacity is between 4 c.f.m. and 8 c.f.m. When tube 88 is ½ inch in diameter and the capacity is 16 c.f.m. to 32 c.f.m., a temperature of minus 60° F. or below is produced. At 50 percent cold fraction, the same respective vortex tubes will produce minus 15° F. or below and minus 22° F. or below.

The vortex tubes 81 are arranged so that the cold air tube 84 of each vortex tube communicates with a common distributor chamber 73 to supply cold pressurized gas thereinto. Each chamber 73 is provided in its wall facing the path of glass sheet movement with either a slot opening or a series of modules 67 along a row extending transverse to the path of glass movement so that cold gas contacts the surface of the moving glass sheets to initially cool the glass surface near the furnace exit 14. While conventional air supply nozzles 80 are shown in position to provide additional cooling air along spaced transverse rows beyond the row of modules or nozzles through which the cold gas component is supplied, the apparatus may comprise as many rows of modules or nozzles communicating in like manner with the vortex tubes as desired.

Figure 5:
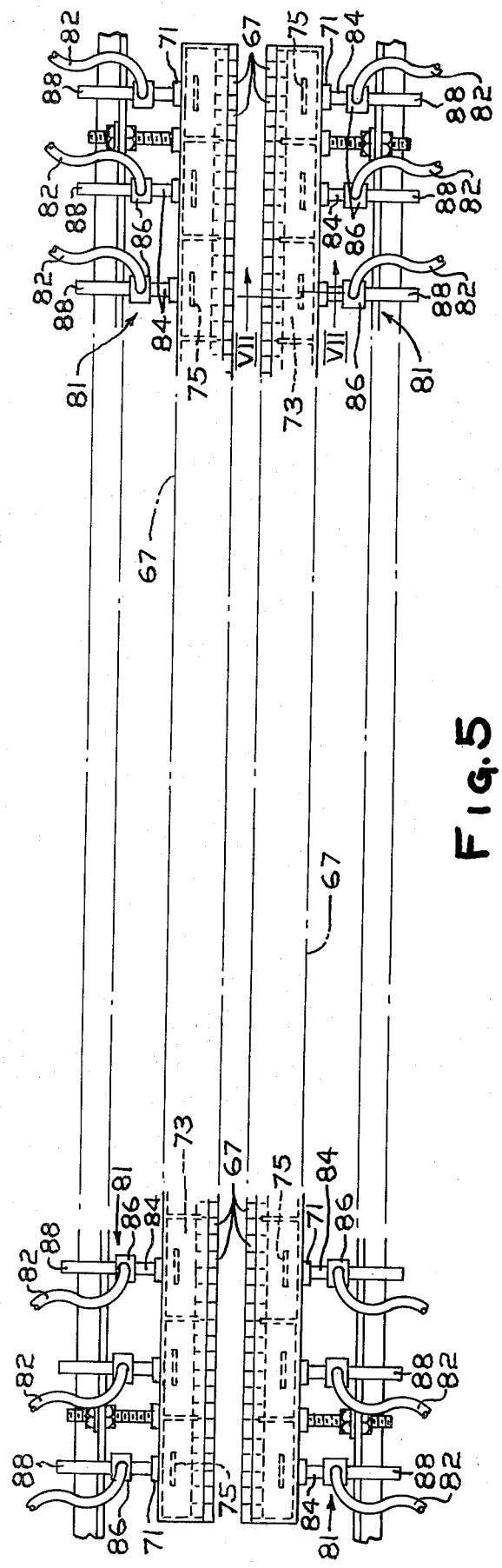
FIG. 5 is a cross-sectional view of an array of upper and lower vortex tube-module arrangement for the entrance portion of the cooling station.

Each cold air outlet tube 84 has a fitting screwed into a boss 71 in a wall of a selected distribution chamber 73 spaced from the wall of the chamber that faces the path of glass sheet movement, as shown in FIG. 5. A small baffle plate 75 is axially aligned with each boss 71 within chamber 73. A series of distribution chambers 73 extends transversely of the direction of glass sheet movement in end to end relation to form a row. Each distribution chamber provides pressurized air to a set of six modules 67. The latter are preferably of square or rectangular cross-section and plan and are arranged to face a corresponding surface of moving glass sheets as the latter move beyond the furnace 12 along the path of glass sheet movement.

Figure 7:
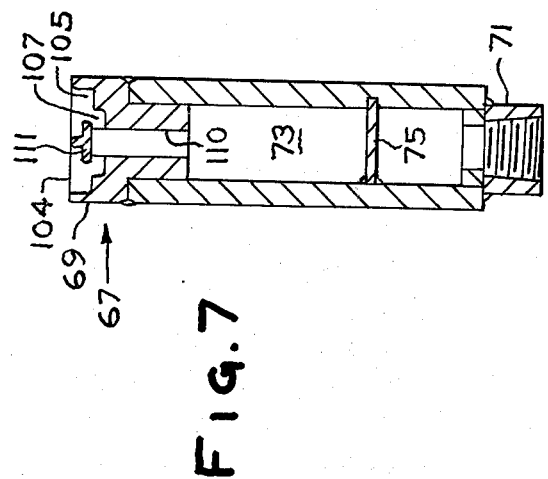
FIG. 7 is a fragmentary elevational view taken along the lines VI—VI of FIG. 5.
Figure 6:
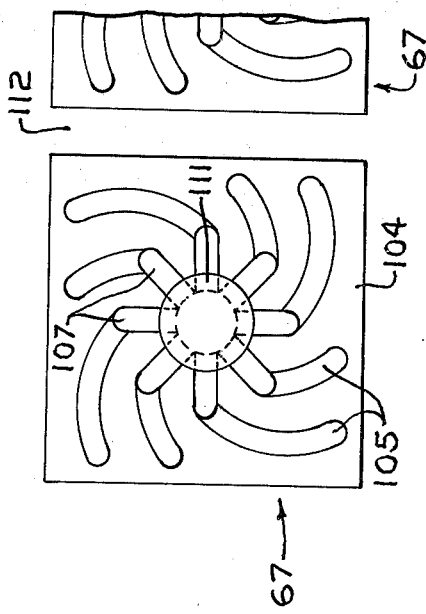
FIG. 6 is a plan view of a glass facing surface of a portion of a set of rosette modules.
Figure 8:
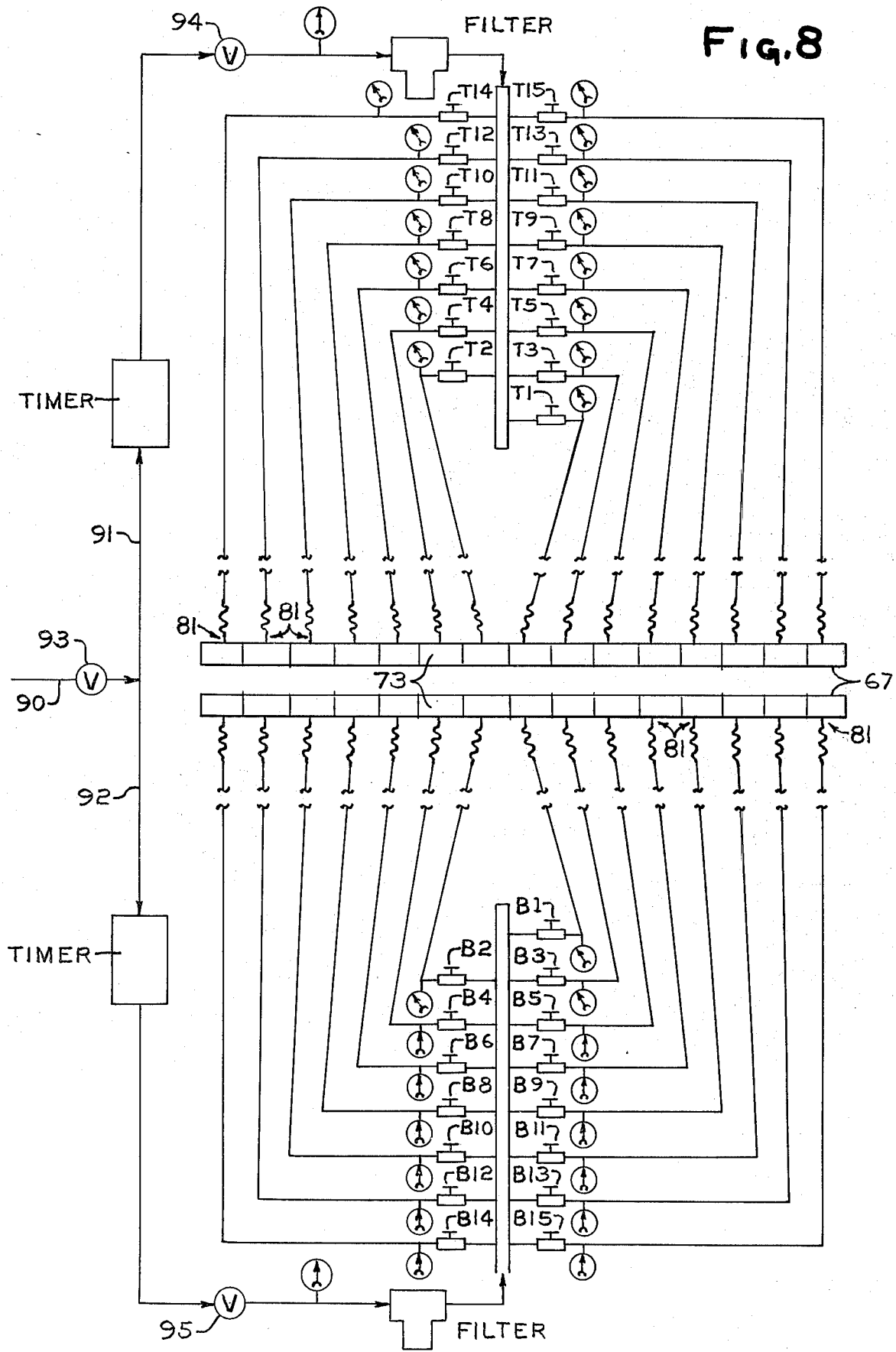
FIG. 8 is a schematic diagram of a control system for imparting air to each vortex tube for distribution toward a portion of a glass sheet surface through an arrangement of modules according to the present invention.

FIGS. 6 and 7 illustrate an embodiment of a module which has a particularly high heat transfer rate and is of the type depicted in U.S. Pat. No. 3,223,500 to Misson. The module is most advantageously suited for use in quenching a heated sheet of glass to produce a very high degree of temper therein while still preserving the surface uniformity and optical characteristics of the heated glass sheet.

Each module 67 includes a stem and an axially aligned body portion 69 having an end surface or, in the position of the module shown in FIGS. 6 and 7, an upper surface 104 of generally rectangular configuration. The latter contains a plurality of coplanar, arcuate grooves 105 (FIG. 6) extending outwardly from a central part of the module at which location each groove communicates through a radial portion 107 with a central passageway 110 extending through the stem and communicating with the distributor chamber 73 at its end away from surface 104. A fixed cap member 111 cooperates with radial groove portions 107 and central passageway 110 to form a restrictive orifice for each groove 105. With this arrangement, cold air from a cold air from a cold outlet tube 84 via the distributor chamber 73 is fed under pressure to the centermost portion of each arcuate subdivision of the module and flows along the arcuate subdivisions or grooves while escaping over the walls thereof and across the upper surface 104 of the module 67 to exhaust zones 112 that surround each module 67.

When the module is in close proximity to a sheet of material, the pressure of the gas within the grooves 105 and adjacent the surface 104 exerts a force against the sheet capable of cooling the latter. Turbulent flow is created by the constantly changing direction of the gas modules caused by the arcuate path of grooves 105 as well as by the velocity increase caused by flowing from the grooves, across the edges thereof and into the space between the glass and the module surface 104. The result is an extremely high rate of heat transfer between the adjacent sheet of material and the flowing gas.

Beyond the opposing pair of rows of modules 67 and intermediate adjacent additional conveyor rolls 20 in the cooling station 16, there are provided conventional upper and lower elongated slot nozzles 80, which are conventionally used in roller conveyor types of tempering apparatus. The slot nozzles extend transverse to the path of glass movement and provide openings for streams of tempering medium to impinge against the surfaces of glass sheets as the latter are conveyed through the cooling station 16.

As stated previously, the vortex tubes 81 are arranged in a top set of 15 vortex tubes, each having its inlet tube 82 communicating with a corresponding air supply tube T-1 to T-15, and a bottom set of 15 vortex tubes, each having its inlet tube 82 communicating with a corresponding air supply tube B-1 to B-15. The top set of vortex tubes extends along a transverse line above the horizontal conveyor 10 while the lower set of vortex tubes extends along a transverse line below the horizontal conveyor. Each supply pipe T1 to T-15 and B-1 to B-15 is provided with a suitable control valve and a gauge.

Each vortex tube 81 communicates with a set of six modules 67 to furnish an air cushion at the surfaces 104 of the modules 67. Each set of modules is about 6 inches long in the direction parallel to the axis of conveyor rolls 20 and about 1 inch wide in the direction of glass travel.

Air stored under pressure is supplied through a main pipe 90 into a top branch pipe 91 for distribution through any or all top air supply tubes T-1 to T-15 and into a bottom branch pipe 92 for distribution through any or all bottom air supply tubes B-1 to B-15, and from the respective supply tubes to the corresponding vortex tubes 81 and modules 67 toward the surface or surfaces of the moving glass sheets as desired. The main pipe 90 is provided with a main shut-off valve 93. In addition, top branch pipe 91 has a shutoff valve 94 and bottom branch pipe 92 has a shutoff valve 95. Shutoff valves 94 and 95 are opened in response to timers when desired.

An effective method of using the apparatus so modified is to have the main shut-off valve 93 open continuously, shutoff valve 94 closed and shutoff valve 95 actuated by a timer that is actuated by the glass sensing element S-1. The latter, on sensing the presence of a leading edge of a glass sheet near the furnace exit 14, actuates the timer, which is set to open shutoff valve 95 at such a time that cold air is supplied against a portion of the glass sheet starting with the time that the leading edge of the glass has passed beyond a position aligned between the upper and lower rows of modules by a predetermined distance, usually one to two feet. The timer remains actuated to maintain the shutoff valve 95 open for sufficient time for air to be supplied from the air supply source through main pipe 90, bottom branch pipe 92 and selected bottom air supply tubes B-1 to B-15 to selected vortex tubes 81 and their associated distribution chambers 73 and modules 67 to the bottom glass surface until the trailing edge of the glass sheet passes beyond said position.

The rate of air flow to each vortex tube 81 communicating with the bottom branch pipe 92 is individually adjusted so as to have the timer controlling the regulation of the on or off position of the shutoff valve 95 in the bottom branch pipe 92 control the application of a pattern of air applied against the lower surface of the glass sheet along a portion of its length desired to be exposed to the air.

Further experimentation to optimize the present invention in the fabrication of flat tempered glass sheets ¼ inch thick 130 inches long and 46 inches wide (pattern A) and of the same thickness 85 inches long and 84 inches wide (pattern B) developed the following parameters.

|  | Pattern A | Pattern B |
|---|---|---|
| Length of glass passing before start of air application through bottom vortex tubes | 12 to 24 inches | 12 to 24 inches |
| Pattern of air pressure to bottom vortex tubes | 40 psig to vortex tubes across 48 inch width aligned with path of glass along its width | No air applied to center 30 inches. 40 psig to 30 inch width to each side of central area |
| Application of air to upper vortex tubes | None | None |

OPERATION

In typical operations, float glass sheets having a nominal thickness of ¼ inch were conveyed through a furnace 80 feet long and a cooling station at various speeds ranging from 190 to 220 inches per minute to develop an overall temperature of 1200°F. to 1220°F. The heating pattern along the length of the furnace was such that the upper heating elements were supplied with power at an average power density of 3.19 kilowatts per square foot and the lower heating elements were supplied with power at an average power density of 3.16 kilowatts per square foot.

As the glass sheets moved through the cooling station, they passed between air streams from the upper plenum applying air in a downward direction at a pressure of 8 ounces per square inch measured at the upper plenum and air streams from the bottom plenum applying air in an upward direction at a pressure of 6 ounces per square inch measured at the lower plenum.

One set of glass sheets having rectangular outlines 84 inches by 85 inches and another set of glass sheets having rectangular outlines 130 inches by 46 inches were heat-treated to produce tempered glass products for sale. Unfortunately, both sets of patterns has an upward curl in their leading edge that was unacceptable to the customer.

Applying cold air through one or both rows of vortex tube-module arrangement described previously throughout the entire length of the glass sheets either to both glass surfaces or to the upper glass surface alone or to the lower glass surface alone as the glass passed between the rows of vortex tube-module systems failed to reduce the upward curl sufficiently to satisfy the customer. These tests were performed at various line pressures to the vortex tubes ranging from 20 psig to 80 psig.

However, when the onset of the application of the cool air applied only through the bottom branch pipe 92 was postponed until after the first 12 to 24 inches of length had passed between the rows of vortex tube-module arrays and then the cool air was applied only to the lower glass surface at this position, the resulting tempered glass sheets had significantly less upward curl so that they passed the standards for flatness required by the customer.

It is understood that any pattern of upward air flow transverse to the path of glass movement that can be developed by independent control of each of the 15 bottom air supply tubes may be provided between the furnace exit and the entrance to the conventional cooling station. Generally, a uniform pattern is suitable across the width of relatively narrow glass sheets and wider glass sheets require more complex patterns of flow of cooling medium to control flatness along the dimension transverse to the direction of glass sheet movement. However, regardless of whether the pattern of upward air flow transverse to the path of glass movement is uniform or non-uniform or continuous or non-continuous as the glass moves from the furnace to the cooling station, the manner of applying the upward air flow toward the lower glass surface only as the glass sheet moves past the line of application must be non-uniform along the direction of glass movement to comply with the teaching of the present invention and must be applied to a portion only of the length of the glass sheet, preferably omitting any application toward the leading edge portion of the glass sheet.

It is readily appreciated that the vortex tube-module system disclosed may be replaced with a system of nozzles of either the slot type or of cylindrical type arranged in the manner depicted for the vortex tube-mobile system of the illustrative embodiment in the practice of the present invention. It is also appreciated that the rate of air flow applied may vary from the range recited and that a cooling medium other than air may be substituted, if desired. It is also appreciated that the application of cooling medium would be applied to the major glass sheet surface facing opposite to the direction of leading edge curl so that if the furnace heating results in the leading edge of the glass sheet curling down, the cooling medium would be applied to the upper major surface.

The form of the invention shown and described herein represents an illustrative embodiment thereof and various changes other than those enumerated previously may be made without departing from the gist of the invention as defined in the claimed subject matter which follows.

We claim:

1. In the art of tempering a substantially horizontally disposed glass sheet which is conveyed in a substantially horizontal direction in direct sequential contact with successive conveyor elements spaced longitudinally of and extending transversely of the path of glass movement through a hot atmosphere where said glass sheet is heated to an elevated temperature sufficient for tempering and which is thereafter conveyed through a cooling station where said hot glass sheet is exposed to cooling medium applied toward the upper and lower major surfaces of said sheet in an amount and at a rate sufficient to impart at least a partial temper to said sheet and wherein said sheet has sufficient length to develop a convexly curved deviation from flatness in its leading edge portion, the improvement comprising applying a cooling medium to a portion of the major surface of the glass sheet adjacent to said leading edge portion wherein said convexly curved deviation from flatness occurs along a longitudinally extending portion thereof spaced from said leading edge of said glass sheet as said glass sheet moves from said hot atmosphere to said cooling station, said cooling medium being applied in an amount and at a rate sufficient to minimize said convexly curved deviation from flatness.

2. The improvement as in claim 1, wherein said deviation is an upward curl and said cooling medium is applied to the lower major surface of said glass sheet.

3. The improvement as in claim 2, wherein the cooling medium is applied to a portion only of said lower major surface in a non-uniform pattern of flow along a dimension of said glass sheet extending transverse to said horizontal direction.

4. The improvement as in claim 2, wherein said cooling medium is applied only to the portions of said glass sheet flanking the central portion thereof along a dimension extending transversely of said direction.

5. The improvement as in claim 2, wherein said cooling medium is air.

6. The improvement as in claim 1, wherein said cooling medium is air.

* * * * *